3,158,564
PROCESS FOR HYDROCARBON CONVERSION
Edward L. Cole, Glenham, and Edwin C. Knowles, Poughkeepsie, N.Y., assignors to Texaco Inc., New York, N.Y., a corporation of Delaware
No Drawing. Filed Jan. 26, 1961, Ser. No. 84,990
4 Claims. (Cl. 208—122)

This invention relates to a catalytic structure and, more particularly, is concerned with an improved supported catalytic structure.

During catalytic processing with solid particulate catalysts, the reactants are passed through a bed of porous catalyst particles, beads or pellets. In many such reactions employing organic materials at elevated temperatures, a carbonaceous deposit accumulates in the pores and opening of the catalyst as the process proceeds under continuous operating conditions. This deposition of carbonaceous material, commonly known as fouling of the catalyst, is a function of the reactants, the reaction products, the conditions of the process, and the catalyst, and certain types of reactants may be worse offenders than others. Fouling may be particularly excessive when the reactants or products remain in contact with the catalyst for a relatively long time. When a porous catalyst is used, the reactants diffuse into the interior or central portion of the catalyst particle and may be retained for an excessive period of time whereupon decomposition of the reactants and products results in fouling of the catalyst. Fouling results not only in a decrease in catalyst activity and loss in selectivity, but also results in intensification of the heat transfer problem in the catalyst bed thereby resulting in local overheating or "hot spots," particularly during regeneration of the catalyst.

Heat transfer and temperature control in a catalyst bed often are difficult problems by reason of the heat of reaction which accompanies numerous catalytic reactions. Thus, in an exothermic reaction, for example, the heat evolved in processing may result in formation of local overheating or "hot spots" unless distributed substantially uniformly throughout the catalyst bed or otherwise dissipated from the reaction zone. Generally it is desirable, or essential, to maintain the reaction temperature within a predetermined range in order to obtain the maximum yield of desired products. Local overheating and temperature variations in the catalyst bed are therefore deleterious and may result in excessive coking of the reactants, inactivation of the catalyst, or otherwise cause undesired side reactions.

The catalyst bed, customarily provided in a composite form comprising an active component supported by a carrier, is generally a relatively poor conductor of heat. Temperature control may be particularly difficult in a conventional packed column or fixed bed reactor where each layer of catalyst is, in effect, partially insulated from adjacent layers. Heat carriers or heat conductive materials have been proposed as one means of reducing temperature gradients in a catalyst bed. For carrying out some highly exothermic or highly endothermic reactions, it has been proposed to incorporate pieces of metal or other suitable heat conductive solid material in the fixed catalyst bed to facilitate heat transfer to the surroundings. Heat transfer and temperature control of the catalyst bed have been achieved also by employing a gaseous or liquid heat-transfer medium usually circulated through a jacket surrounding the reactor. The reactants may be diluted with steam or an inert gas as a further means of achieving temperature control. However, the known or proposed methods regarding thermal control necessitate especially designed reactors, and further may require materials and equipment in addition to that normally employed.

In certain processing operations, the temperature may be controlled within the desired range by employing low flow rates or low conversion levels to limit the rate of heat released by the reaction. However, this normally results in a corresponding decrease in yield per unit of time. Notwithstanding this precaution, uncontrollable local overheating and temperature variations in the catalyst bed may occur.

This invention has therefore as its purpose to provide a catalytic structure capable of conducting heat to permit carrying out reactions under substantially isothermal conditions and characterized by relatively high activity over long periods. The catalytic structure of this invention is provided with an extended tubular metal substrate exhibiting relatively high thermal conductivity which affords an effective means for adequately controlling the thermal conditions of the reaction thereby minimizing, or substantially eliminating, temperature variations in the reactor and local overheating and fouling of the catalyst. Equally important, our catalytic structure may comprise the walls of the reactor thereby obviating the need for employing a packed column of catalyst. As a result, the quantity of active catalyst material used in our catalytic structure is greatly reduced as compared to the quantity required in conventional structures. In some cases, a substantial portion of the structural and supporting members of the reactor can be eliminated. The improved catalyst structure of this invention permits compactness in design and often decreases substantially the capital costs and operating costs. It is significant that the foregoing and other objects are realized without diminishing the flow rates of the reactants, but, on the contrary, in many catalytic processes, the reaction rates may be greatly increased without any appreciable decrease in product yield. These together with other objects and advantages will be apparent to one skilled in the art upon reading the following description.

The novel catalytic structure of our invention involves broadly an extended tubular metal substrate exhibiting relatively high thermal conductivity and capable of readily forming an adherent oxide coating of film on at least one surface thereof. Metals found most useful include those selected from the group consisting of aluminum, tantalum and titanium. The integrally formed oxide film, preferably a relatively porous and adsorbent oxide film, provides an active catalytic surface for use in a wide variety of catalytic processes. The metals may be in the form of a pure metal, a commercial metal containing the usual impurities, or a base alloy of the metal.

The oxide film, formed on at least one surface of the tubular substrate, may be produced by any of several known methods, including chemical and electro-chemical methods, but must be of sufficient thickness to provide an adequate quantity of catalyst material. To insure adequate performance under the conditions encountered in catalytic processing, however, the artificially produced oxide film generally should not be substantially thinner than about 0.1 mil, and preferably not less than about 0.5 mil, usually about 0.5 to 1 mil being desirable. Where an aluminum metal substrate is employed, for example, the oxide film may be produced by treating the aluminum surface wtih a solution of an alkaline carbonate, usually a sodium carbonate-chromate solution. The film may be produced by the anodic oxidation of the metal surface whereby the metal is made the anode in an electrolytic solution. In anodizing aluminum, a 15% sulfuric acid solution is commonly employed as the electrolyte, but other acid electrolytes such as chromic acid, oxalic acid and sometimes boric acid may be used. Titanium and tantalum may be anodized advantageously in a boric acidammonia solution having a pH of about 8. In all cases the oxide film to which this invention relates is produced by artificial means and does not include relatively thin natural oxide films occurring on metal surfaces which have been exposed to the atmosphere.

The present invention is particularly applicable to anodic films, and more especially to aluminum surfaces having an anodically produced film, and therefore will be described in more detail in connection with films of this type. Oxide films formed by this well-known commercial method are relatively porous and adsorbent, and though this constitutes a preferred embodiment of our invention, it should be understood that other conversion films including barrier type films, are also useful in the preparation of the catalyst structure of our invention.

It will be observed that the catalytic structure of our invention may be advantageously used in a wide variety of catalytic processes employing a hydrocarbonaceous feed stock under suitable conditions of temperature and pressure. The term "hydrocarbonaceous" as used herein is intended to include hydrocarbons and oxygenated hydrocarbons. Thus, for example, a number of unsaturated compounds containing an ethylenic or acetylenic linkage may undergo hydrogenation or hydration employing our catalytic structure, as will certain cycloparaffins, for example, cyclohexane, and organic compounds containing oxygen, for example aldehydes and ketones. Conversely, the catalytic structure may be useful in the dehydrogenation or dehydration of a variety of organic compounds, as for example in the production of an olefin from a corresponding paraffin by dehydrogenation, or in the dehydrogenation or dehydration of an alcohol to produce a corresponding aldehyde or ketone. In addition, our catalytic structure may be useful in such typical operations as isomerization, polymerization or alkylation of paraffinic or aromatic hydrocarbons. Further, the catalytic structure may be useful in the oxidation of various organic compounds such as in producing an aldehyde or ketone from the corresponding alcohol, as well as in various cracking reactions and in halogenation-dehalogenation processes.

Referring now in greater detail to the catalytic structure of our invention and the attendant advantages, the catalytic structure provided in the form of a tube is desirably of relatively small inside diameter. The inside diameter of the tube, in general, may range from about 0.05 to 0.5 inch, but is dependent upon the type of catalytic reaction, materials undergoing reaction and the capacity of the pumping mechanism to accomplish turbulence. In the preferred embodiment, the interior wall of the tube is provided with the desired artificially produced oxide film, e.g. an anodically produced oxide film. The tube through which the reactants pass is preferably of a continuous length sufficient to accomplish the desired catalytic reaction in economic yields, but may be coiled to conserve space. The length of the tube may depend to some extent upon the reaction contemplated, and therefore may be readily determined by one skilled in the art. The wall of the reactor provides adequate support and mechanical strength for the catalyst, and thereby affords a substantially self-sustaining structure. Packed reaction columns are eliminated as are many of the structural and supporting features employed in a conventional catalytic reactor.

The extended metal substrate is initially provided with an artificially produced oxide film which is relatively thin as compared to the substrate. Thus, the substrate is of sufficient thickness such that the oxide film may be adequately produced and still maintain a free metal substrate. Generally an oxide film of about 0.5 to 1 mil is sufficient, but thicker films or thinner films, may be employed where desired. The thin oxide film defines the depth of the catalyst layer, and therefore limits the extent of diffusion of the reactants through the pores and openings in the catalytic material to this narrow depth. As a consequence, substantially all of the catalyst material is exposed to the reactants, and entrapment of the reactants by the catalyst bed is minimized or substantially eliminated. In this manner, we readily achieve with less catalyst material a reactive capacity equal to, or greater than, that accomplished by convention catalysts.

Equally important, the catalytic structure of this invention functions substantially as an isothermal surface in that the metal tube provides an adequate means to control the temperature or heat transfer to or from the catalyst. The metal wall, being a good heat conductor, may be employed as a heat exchanger notwithstanding the relatively thin oxide film. A suitable heat exchange medium may be applied to the exterior wall of the metal tube. During processing the heat evolved in the catalyst bed is readily conducted by the wall of the tube to the surroundings where it is adsorbed and dissipated by the heat exchange medium. On the other hand, the tubular wall may be employed for supplying heat from a heating medium in the case of an endothermic reaction. This invention also contemplates that the oxide film may be formed on the exterior wall surface of the catalytic tube, and the heat exchange medium passed through the interior thereof. It should be understood that in an economic and commercial operation, a number of the catalytic tubes may be housed in parallel in a single unit and arranged in contacting relation with a heat exchange medium.

It is of further significance that in the catalytic tube having a relatively small inside diameter, highly turbulent flow of the reactants passing through the tube is readily maintained. As a consequence, near maximum reaction rates are achieved. In addition, the catalytic structure of our invention markedly reduces the residence time of the reactants in the reactor, as explained above. Consequently the reactor may be operated at high temperatures, or optimum temperatures, or, more important, in many cases at higher temperatures and faster reaction rates than those normally encountered in a conventional reactor, without danger of excessive coking or fouling of the catalyst.

The catalytic tube formed in accordance with the invention is of further advantage in that the reaction gases in certain processes, particularly hydrogen present in hydrogenation-dehydrogenation reactions, may be caused to pass through the tube by use of a pervious or permeable tube, optionally with the application of a pressure differential between the interior and exterior of the tube. A porous tube may be formed from powdered metal, preferably sintered, by known procedures in the field of powder metallurgy. Thus, for example, in a hydrogenation process, hydrogen may be diffused through the tube and into immediate contact with the catalyst surface where reaction occurs, thereby more fully utilizing the reactants and increasing the reaction rates. In other processes, the reactant gases may be caused to pass in or out of the catalyst tube through the permeable wall of the tube.

The following examples will further illustrate our invention:

*Example I*

Aluminum tubing of commercial purity was coiled for use as a reactor, the tubing measuring 10 feet in length and having an inside diameter of 0.089 inch and a wall thickness of 0.049 inch. The tubing is desirably cleaned on the interior surface by conventional practice as by etching for one minute in a 5% aqueous sodium hydroxide solution at 150° F., rinsing with water, and then immersing in a 35% nitric acid solution for 30 seconds at room temperature and again rinsing with water. The interior wall of the tubing was then anodized in a moving stream of 15% sulfuric acid electrolyte for 60 minutes with a current density of 15 amperes per square foot and at an electrolyte temperature of about 72° F. The interior of the tubing was rinsed with cold water.

The anodized tubing was employed as a catalytic reactor in the dehydration of butanol-1. The tubing was placed in a suitable furnace, flushed with nitrogen, and then heated to about 650° F. In the reaction, 20 milliliters of butanol-1 (measured at 74° F.) were charged to the reactor over a period of 1 hour, and the products of the reaction were recovered in a cold water condenser. Analysis showed that about 24.6% of the charge was converted, the product distribution being about 88 mol percent butenes, the balance being other olefins and hydrocarbons as well as hydrogen.

For purposes of comparing the catalytic activity of the anodized aluminum tubing, a run employing an identical tubular reactor as above but having no anodized surface was conducted under substantially identical conditions. There was substantially no conversion of the butanol-1, and hence no recovery of butenes or other olefins, thereby showing a substantial catalytic effect for the anodized aluminum.

*Example II*

Aluminum tubing in coil form, having substantially the same dimensions as that employed in Example I, was anodized on the interior surface as in Example I. The treated tubing was then used in the isomerization of cyclohexene. The feed stock was charged to the reactor at a temperature of 750° F., a residence time of 0.42 second and at atmospheric pressure. Analysis of the product recovered in a cold water condenser showed a conversion of 0.214 mol cyclohexene to methyl-cyclopentenes per square foot per hour.

A blank run under the same conditions was made employing aluminum tubing of substantially the same dimensions as above and having no anodized surface for purposes of comparing the catalytic activity of the anodized aluminum tube. There was substantially no conversion of the cyclohexene, thereby showing a substantial catalytic effect for the anodized aluminum.

*Example III*

Aluminum tubing in coil form having substantially the same dimensions as that employed in Example I and anodized on the interior surface as in Example I, was employed as a catalytic reactor in the cracking of di-isobutylene. The feed stock was charged to the reactor at a temperature of 800° F., a residence time of 3.2 seconds and at atmospheric pressure. Analysis showed that 29.4% of the feed stock was converted to products having a lower molecular weight than di-isobutylene, and greater than 90% of the product comprised isobutylene.

Again, a blank run was conducted under substantially identical conditions employing an aluminum tube of the same dimensions as above but having no anodized surface for purposes of comparing the catalytic activity of the anodized reactor. Substantially no cracking of the di-isobutylene feed stock resulted from the treatment, thereby showing a substantial catalytic effect for the anodized aluminum.

We claim:
1. A method of effecting catalytic conversion of a hydrocarbonaceous material which comprises passing said hydrocarbonaceous material under conversion conditions of temperature and pressure through an elongated reaction zone having a relatively small and substantially uniform internal cross-sectional area with walls formed of a metal selected from the group consisting of aluminum, tantalum and titanium and having an oxide film of at least 0.5 mil thickness integral with the inner surface thereof produced by anodic oxidation of said metal.
2. The method according to claim 1 wherein said catalytic treatment is dehydration.
3. The method according to claim 1 wherein said catalytic treatment is isomerization.
4. The method according to claim 1 wherein said catalytic treatment is cracking.

References Cited in the file of this patent

UNITED STATES PATENTS

| | | |
|---|---|---|
| 2,526,657 | Guyer | Oct. 24, 1950 |
| 2,742,437 | Houdry | Apr. 17, 1956 |
| 2,930,767 | Novak | Mar. 29, 1960 |
| 2,974,150 | McClements et al. | Mar. 7, 1961 |
| 3,043,651 | Pietzsch | July 10, 1962 |

FOREIGN PATENTS

| | | |
|---|---|---|
| 489,757 | Great Britain | July 27, 1938 |
| 675,914 | Great Britain | July 16, 1952 |